Figure 1:
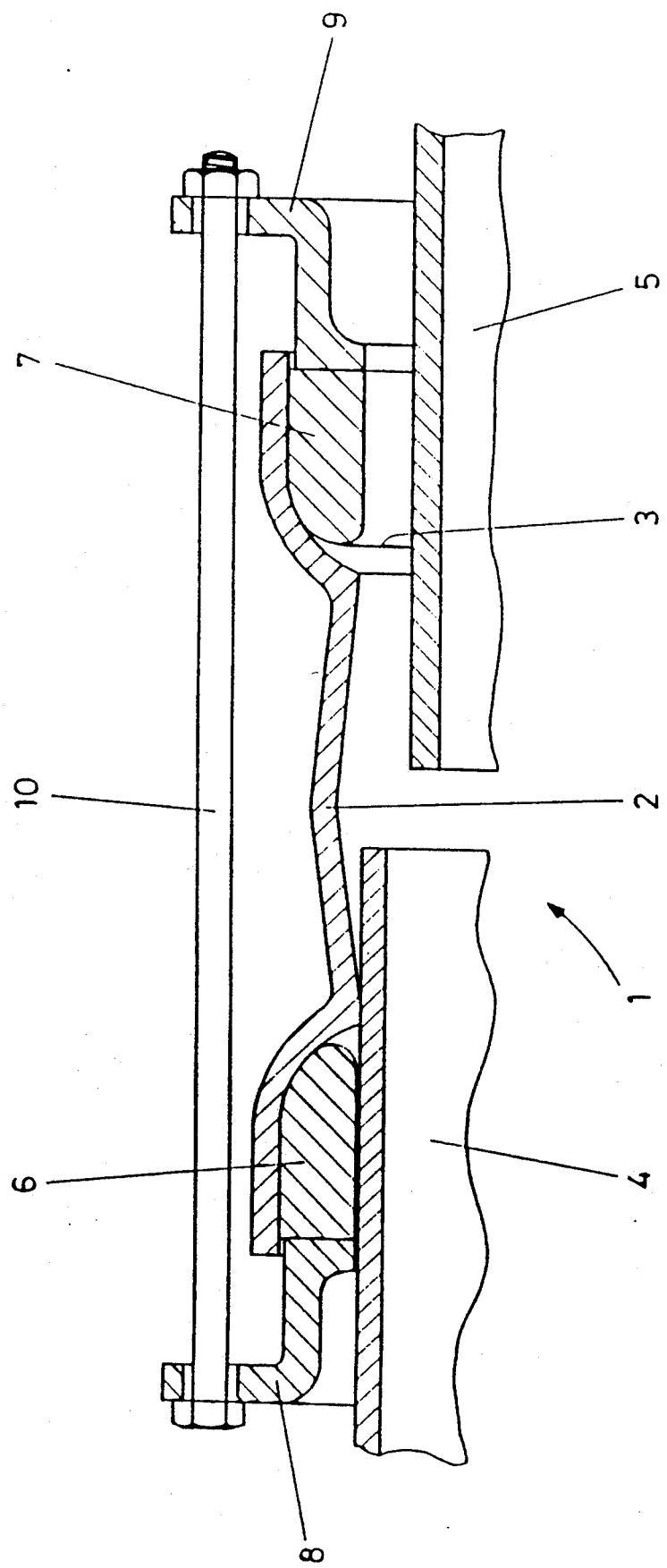

United States Patent [19]

Greatorex

[11] Patent Number: 5,150,929
[45] Date of Patent: Sep. 29, 1992

[54] PIPE JOINTS

[75] Inventor: Cyril B. Greatorex, Stapleford, United Kingdom

[73] Assignee: Stanton plc, United Kingdom

[21] Appl. No.: 742,059

[22] Filed: Aug. 6, 1991

Related U.S. Application Data

[63] Continuation of Ser. No. 488,087, filed as PCT/GB88/01132, Dec. 19, 1988, abandoned.

[30] Foreign Application Priority Data

Jan. 6, 1988 [GB] United Kingdom ............... 8800245

[51] Int. Cl.⁵ .......................................... F16L 21/04
[52] U.S. Cl. .................................... 285/231; 285/232; 285/337; 285/342; 285/369
[58] Field of Search ............... 285/108, 231, 232, 337, 285/342, 343, 346, 369

[56] References Cited

U.S. PATENT DOCUMENTS

| | | | |
|---|---|---|---|
| 839,750 | 12/1906 | Graham | 285/343 |
| 853,900 | 5/1907 | Saunders | 285/231 X |
| 1,310,740 | 7/1919 | Coffey | 285/342 |
| 1,888,539 | 11/1932 | Otterson | 285/342 X |
| 2,286,565 | 6/1942 | Norton | 285/342 X |
| 2,405,822 | 8/1946 | Franck | 285/232 |
| 3,653,692 | 4/1972 | Dunton et al. | 285/342 X |
| 4,863,199 | 9/1989 | Hojo et al. | 285/232 |

FOREIGN PATENT DOCUMENTS

| | | | |
|---|---|---|---|
| 660631 | 4/1963 | Canada | 285/231 |
| 851062 | 9/1970 | Canada | 285/231 |
| 0537405 | 5/1922 | France | 285/346 |
| 1180652 | 6/1959 | France | 285/369 |
| 1229584 | 9/1960 | France | 285/231 |
| 2156466 | 10/1985 | United Kingdom | |

Primary Examiner—Randolph A. Reese
Assistant Examiner—Heather Chun
Attorney, Agent, or Firm—Marshall, O'Toole, Gerstein, Murray & Bicknell

[57] ABSTRACT

A pipe joint consists of a sleeve (2) surrounding a socket chamber (3) for receiving a spigot (5). A gland (9) extends into the socket chamber (3) against a heel portion (12) of a sealing ring (7). Axial movement of the gland (9) forces the sealing ring (7) and causes a leading nose portion (14) of the sealing ring (7) to be deflected radially inwardly by the internal profile of the sleeve (2) against the external surface of the spigot or pipe end (5), thereby forming a seal. The heel portion (12) of the seal ring (7) maintains substantially the same radial position in the socket (3).

9 Claims, 2 Drawing Sheets

PIPE JOINTS

This application is a continuation of application Ser. No. 07/488,087, filed as PCT/GB88/01132, Dec. 19, 1988, now abandoned.

TECHNICAL FIELD

The invention relates to pipe joints in which sealing rings are compressed by axially movable members. Such joints are suitable for pipe ends, couplings and fittings. The pipes may be used for conveying fluids, and particularly in mains water supply and drainage.

BACKGROUND ART

Pipe joints comprising a sealing ring which is radially compressed to form a seal between a spigot and a sleeve or socket are well known in the art. An example of such a joint, incorporated into a pipe coupling, is discussed in Patent Specification GB 2156466. The joint disclosed therein has an O-ring seal which is seated in the flange of a sleeve, and contacts a spigot which is inserted into the sleeve. An axially movable ring surrounding the end of the sleeve compresses the O-ring against the flange and causes the O-ring radially to deform. The radial deformation forms a seal between the sleeve and the spigot. Joints utilising sealing mechanisms such as this are limited, however, by their tolerance of a variation in the outside diameter of the spigot which is received by the sleeve. Conventional joints are designed to accommodate only pipes which are manufactured to standard tolerances, and are unsuitable for jointing pipes which are constructed from different materials and consequently may have incompatible spigot diameters.

The problem is to design a joint which enables spigots of different materials and different diameters to be jointed and thereby eliminates the necessity for a variety of joints, couplings and fittings, each of which is dedicated toward a specific material and a specific diameter of piping.

THE INVENTION

The invention provides a pipe joint which has a sleeve surrounding a socket chamber for receiving a spigot, a sealing ring for positioning between the sleeve and the spigot, a gland around the spigot for applying a load to the sealing ring by axially moving the gland against a trailing heel portion of the sealing ring, characterized in that when the gland applies a load to the sealing ring, a leading nose portion of the sealing ring is deflected radially inwardly by the internal profile of the sleeve against the external surface of the spigot, whilst the heel portion of the sealing ring maintains substantially the same radial position in the socket chamber.

The pipe joint may be integrally formed as part of a pipe end, or the joint may be utilised in a coupling or in a pipe fitting such as a T-junction or a bend. The clearance between the sleeve or socket and the spigot makes it possible for the sleeve or socket to accommodate spigots of different diameter and formed of different materials.

The leading nose portion of the sealing ring is preferably, but not necessarily, rounded in axial section, the better to cooperate with the deflecting internal profile of the sleeve. The deflecting internal profile of the sleeve may itself be rounded in axial section, although not necessarily to the same radius of curvature as the leading nose portion of the sealing ring, in order to enchance the deflection and the resulting radially inward bias imparted to the leading nose portion of the sealing ring. Alternatively the deflecting internal profile of the sleeve may be a shape other than rounded, such as conical or a series of conical surfaces of progressively increasing slope, to achieve the desired deflection as a load is applied to the sealing ring.

The heel portion of the sealing ring maintains its original radial position in the socket chamber because any tendency to reduce the diameter of the sealing ring when it is axially loaded is resisted by radial forces in the sealing ring, aided when necessary by a precompression of the sealing ring when it is fitted into the socket chamber prior to jointing.

THE DRAWINGS

Figure 2:
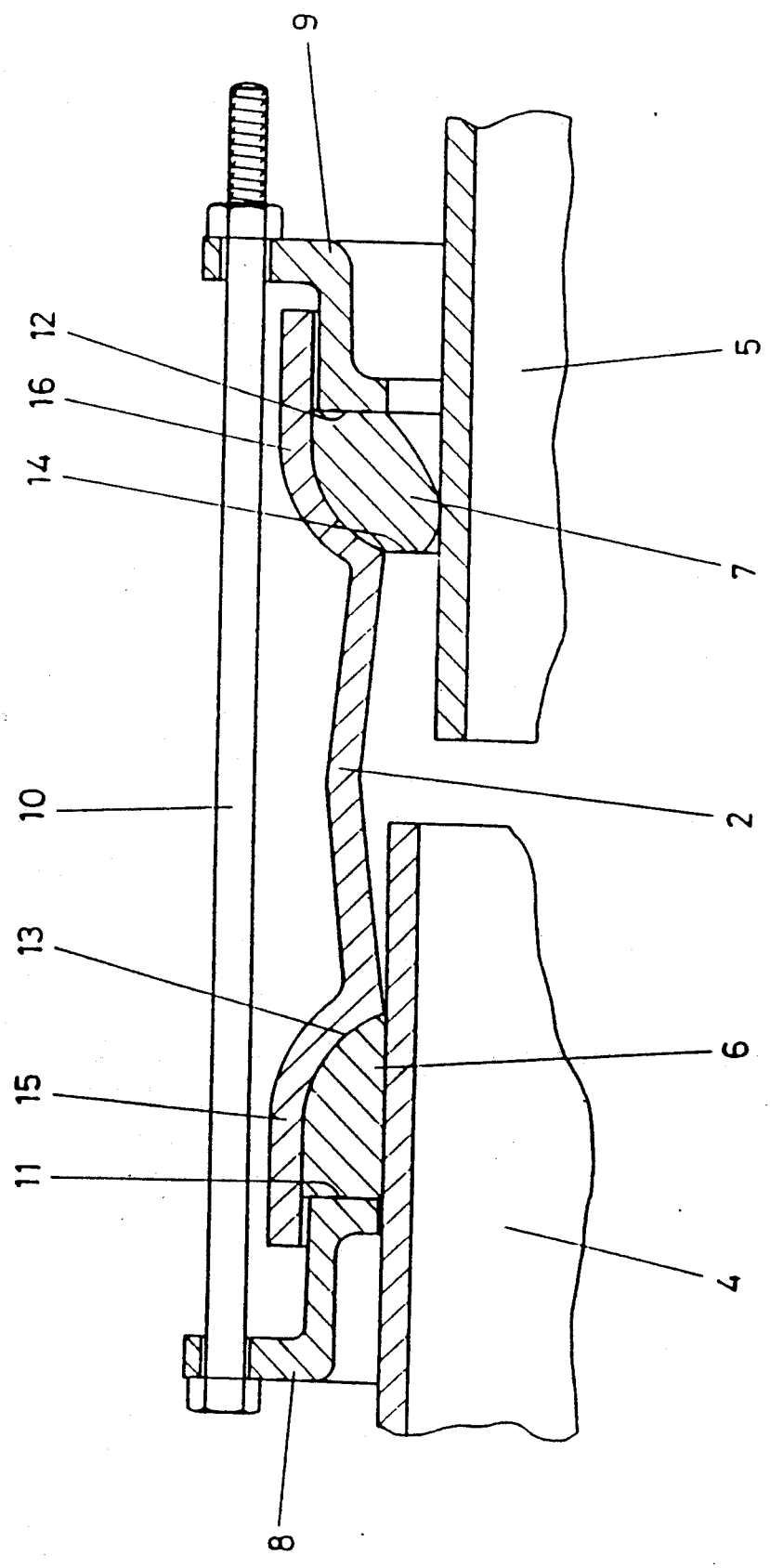

FIG. 1 is a cross sectional view of the circumference of a pipe coupling incorporating a pair of joints according to the invention depicted with their sealing rings uncompressed, and FIG. 2 is a cross sectional view of the circumference of a pipe coupling incorporating a pair of joints according to the invention depicted in the sealed mode.

BEST MODE

With reference to FIG. 1, a coupling indicated generally at 1 has a sleeve 2 defining a socket chamber 3 for receiving a pair of spigots 4 and 5. A pair of sealing rings 6 and 7 are seated respectively between the spigots 4 and 5 and the sleeve 2. Each of the sealing rings 6 and 7 is circumferentially precompressed when it is seated in the sleeve 2 prior to jointing. The degree of precompression is dependent upon the relative diameters of the sealing rings 6 and 7 and the sleeve 2. Each of a pair of glands 8 and 9 extend axially into one end of the sleeve 2 around the spigots 4 and 5 respectively. One of a series of circumferentially arranged bolts 10 is shown, fastening together the two glands 8 and 9.

With reference to FIG. 2, the joints are sealed by tightening the bolts 10 which urge the glands 8 and 9 axially into the sleeve 2. The glands 8 and 9 act upon trailing heel portions 11 and 12 of the sealing rings 6 and 7, forcing leading nose portions 13 and 14 of the sealing rings 6 and 7 to follow a path dictated by the internal curvature of axially outer end portions 15 and 16 the sleeve 2. The noses 13 and 14 of the sealing rings 6 and 7, which are rounded and include undercut portions 13a and 14a, respectively, (shown in FIG. 1) to assist their cooperation with the profile or internal curvature of the sleeve end portion 15 and 16, are deflected and moved radially inwards until they abut the spigots 4 and 5, forming a seal between the sleeve 2 and the spigots 4 and 5.

FIG. 2 clearly shows the ability of the joint to accommodate spigots of different diameters. The curved internal profiles of the sleeve end portions 15 and 16 cause a radially inward deflection of the leading nose portions 13 and 14 of the sealing rings 6 and 7, moving the nose portions 13 and 14 radially inwardly to different extents until a seal is formed with each of the spigots 4 and 5. In contrast, the trailing heel portions 11 and 12 of the sealing rings 6 and 7 remain at substantially their original diameters due to the radial forces induced by a change in the diameter of the sealing rings 6 and 7, and by the circumferential precompression of the sealing rings 6 and 7. The radially inward movement of the leading nose portions 13 and 14 of the sealing rings 6 and 7 is greater in the case of the ring 7 which surrounds the smaller spigot 5. The sealing is also assisted by a servo action produced by the positive pressure of the fluid conducted by the pipes, which forces the sealing rings 6 and 7 against the spigots 4 and 5.

The interior diameter of the sleeve 2 is graduated to allow for pivoting of the spigots 4 and 5 about the joint, although this design of sleeve has been chosen merely to illustrate one possibility of providing a flexible coupling according to the invention and is of no other relevance.

I claim:

1. A pipe joint comprising a sleeve (2) surrounding a socket chamber (3) for receiving a spigot (5), a sealing ring (7) for positioning between the sleeve (2) and the spigot (5), the sealing ring having an axially directed nose portion and an undercut portion spaced from the spigot when the sealing ring is in an unloaded state and a gland (9) around the spigot (5) for applying a load to the sealing ring (7) by axially moving the gland (9) against a trailing heel portion (12) of the sealing ring (7), wherein the heel portion includes an inner diameter of a first size, characterized in that when the gland (9) applies a load to the sealing ring (7), the undercut portion is deflected radially inwardly together with the nose portion (14) of the sealing ring (7) such that the nose portion is at least partially radially directed by the internal profile of the sleeve (2) against the external surface of the spigot (5), wherein the nose portion has an inner diameter of a second size less than said first size, whilst the inner diameter of the heel portion (12) of the sealing ring (7) maintains substantially said first size.

2. A pipe joint according to claim 1 wherein the gland (9) extends into the socket chamber (3).

3. A pipe joint according to claim 1 wherein the end of the sleeve (2) through which the spigot (5) is received has an outermost substantially cylindrical section.

4. A pipe joint according to claim 3 wherein the tip of the leading nose portion (14) of the sealing ring (7) is rounded for cooperation with the internal profile of the sleeve (2).

5. A pipe joint according to claim 4 wherein a section of the sleeve (2) adjacent the cylindrical section of the sleeve (2) has a radially inwardly curving internal profile.

6. A pipe joint according to claim 5 wherein the radii of curvature of the rounded tip of the leading nose portion (14) of the sealing ring (7) and the radially inwardly curving internal profile of the sleeve (2) differ.

7. A pipe joint according to claim 3 wherein a section of the sleeve (2) adjacent the substantially cylindrical section of the sleeve (2) has a radially inwardly sloping internal profile.

8. A pipe joint according to claim 3 wherein a portion of the sleeve (2) adjacent the substantially cylindrical section of the sleeve (2) consists of a plurality of inwardly sloping sections each sloping radially inwardly from the end of the sleeve (2) through which the spigot (5) is received towards the substantially cylindrical section of the sleeve (2) wherein the inwardly sloping sections are of successively increasing slope.

9. A pipe joint according to claim 1 wherein the sleeve (2) includes an internal diameter which is graduated to allow for pivoting of the spigot (5) about the sealing ring (7), the internal graduated diameter being of a first size at a point adjacent an end of the spigot (5) and of a second size less than the first size at a point adjacent a portion of the spigot (5) spaced from the end of the spigot (5).

* * * * *